(12) United States Patent
Nalla et al.

(10) Patent No.: US 8,583,790 B2
(45) Date of Patent: *Nov. 12, 2013

(54) SERVER SESSION MANAGEMENT APPLICATION PROGRAM INTERFACE AND SCHEMA

(75) Inventors: Amar Nalla, Redmond, WA (US); Srikanth Avadhanam, Redmond, WA (US); Gustavo Plancarte, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,553

(22) Filed: Aug. 11, 2011

(65) Prior Publication Data

US 2011/0307605 A1    Dec. 15, 2011

Related U.S. Application Data

(63) Continuation of application No. 11/378,935, filed on Mar. 17, 2006, now Pat. No. 8,024,439.

(51) Int. Cl.
*G06F 15/173* (2006.01)
(52) U.S. Cl.
USPC .......................................... 709/224; 707/634

(58) Field of Classification Search
None
See application file for complete search history.

(56) References Cited

U.S. PATENT DOCUMENTS

| | | | |
|---|---|---|---|
| 5,652,908 A * | 7/1997 | Douglas et al. ................ | 714/4.4 |
| 6,098,093 A * | 8/2000 | Bayeh et al. .................. | 709/203 |
| 6,363,477 B1 | 3/2002 | Fletcher et al. | |
| 6,490,624 B1 | 12/2002 | Sampson et al. | |
| 6,546,394 B1 * | 4/2003 | Chong et al. .......................... | 1/1 |
| 2005/0038789 A1 * | 2/2005 | Chidambaran et al. ......... | 707/10 |
| 2005/0038828 A1 | 2/2005 | Kaluskar et al. | |
| 2005/0050319 A1 * | 3/2005 | Suraski ......................... | 713/164 |
| 2007/0150600 A1 * | 6/2007 | Barsness et al. .............. | 709/227 |
| 2007/0203944 A1 | 8/2007 | Batra et al. | |
| 2007/0214191 A1 * | 9/2007 | Chandrasekaran ........... | 707/202 |

* cited by examiner

*Primary Examiner* — Ario Etienne
*Assistant Examiner* — Clayton R Williams

(57) ABSTRACT

Application program interfaces (APIs), schemas and procedures manage multiple sessions within a server system has a create session request call for establishing a session between a client and a server within the server system. Each of plurality of sessions among the servers is persisted within a database operatively coupled to the servers. Each session is associated with a unique session identification which uniquely identifies the session among the plurality of sessions. A management request call for managing one of the sessions is performed according to the unique session identification.

19 Claims, 9 Drawing Sheets

| SVR | ID | NAME | VER. | DATE | TIME | UPD | STAT |
|---|---|---|---|---|---|---|---|
| | | | | | | | |
| | | | | | | | |
| | | | | | | | |
| | | | | | | | |
| | | | | | | | |
| | | | | | | | |

FIG. 5A

| SVR | ID | VER. | DATE | TIME | STAT | USER | SID | COM. | LANG | HELP | TYPE | CL. |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG. 5B

SERVER SESSION MANAGEMENT APPLICATION PROGRAM INTERFACE AND SCHEMA

BACKGROUND

Management of user sessions is an important feature of any server based product. Many servers have a component that is responsible for managing the sessions that are active on the server. In some cases, servers are responsible for the management of sessions that are created by different types of clients connecting to the server.

Generally, server applications are multi-threaded applications that interact with multiple clients using a request-response mechanism. A request from the client triggers creation of a new thread in the server that is responsible for handling the request. The request, which is also typically called a session, exists with the servers as long as the client is connected to the server. The session includes the user's context and the server uses the session to manage the request. Typically, the session is stored in either a database or a file. However, at any given instance the server has several sessions in its memory. Further, in systems that support multi-server configurations there is often a need to persist the session or part of the session to provide external control of the sessions to the administrators and also for licensing purposes.

SUMMARY

The server session management API between a server system and a persistent store database, along with client session management, server session management and background session management schemas, provides a simplified interface that permits the server to persist sessions and manage active sessions stored in the persistent store database. A server requests access to client session data and to server session data, and performs operations that need access to the session data, such as the administration and monitoring of sessions and enforcing licensing requirements. A server further monitors the state of its sessions and the state of other servers within the server system. Broadly, there are a class of calls for creating client sessions and server sessions. Requests for a session between a client and a server results in a session identification for the session which uniquely identifies the session among the plurality of sessions, and the session is persisted in the database to allow further management of the session. The use of these calls and schemas is expected to assist in the management of client sessions for different client types, assist in the management of server sessions, and improve session administration, monitoring and license enforcement.

BRIEF DESCRIPTION OF THE DRAWINGS

FIGS. 5A and 5B are representative diagrams of table for storing persisted session data;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
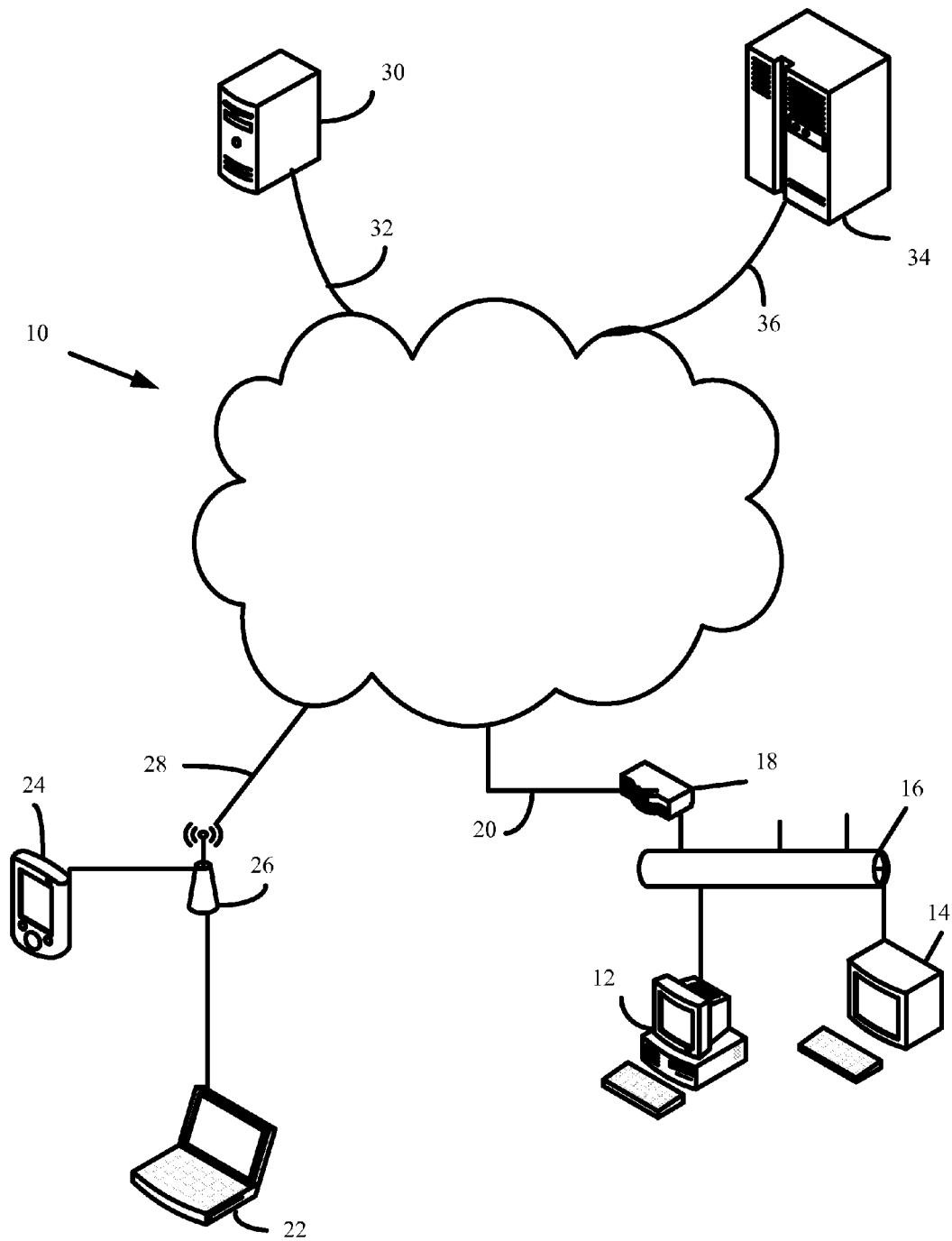
FIG. 1 is a simplified and representative block diagram of a computer network.
Figure 2:
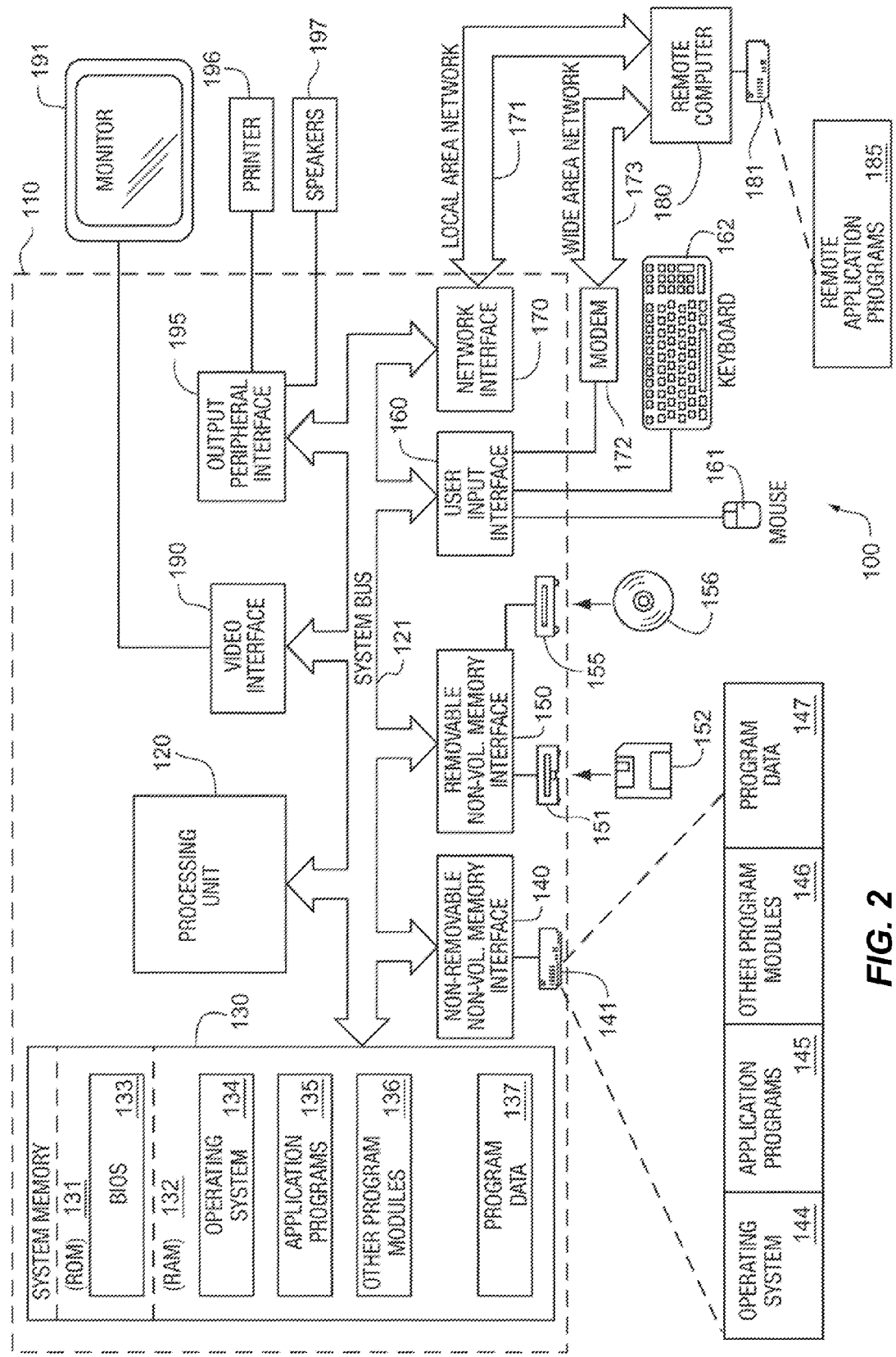
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
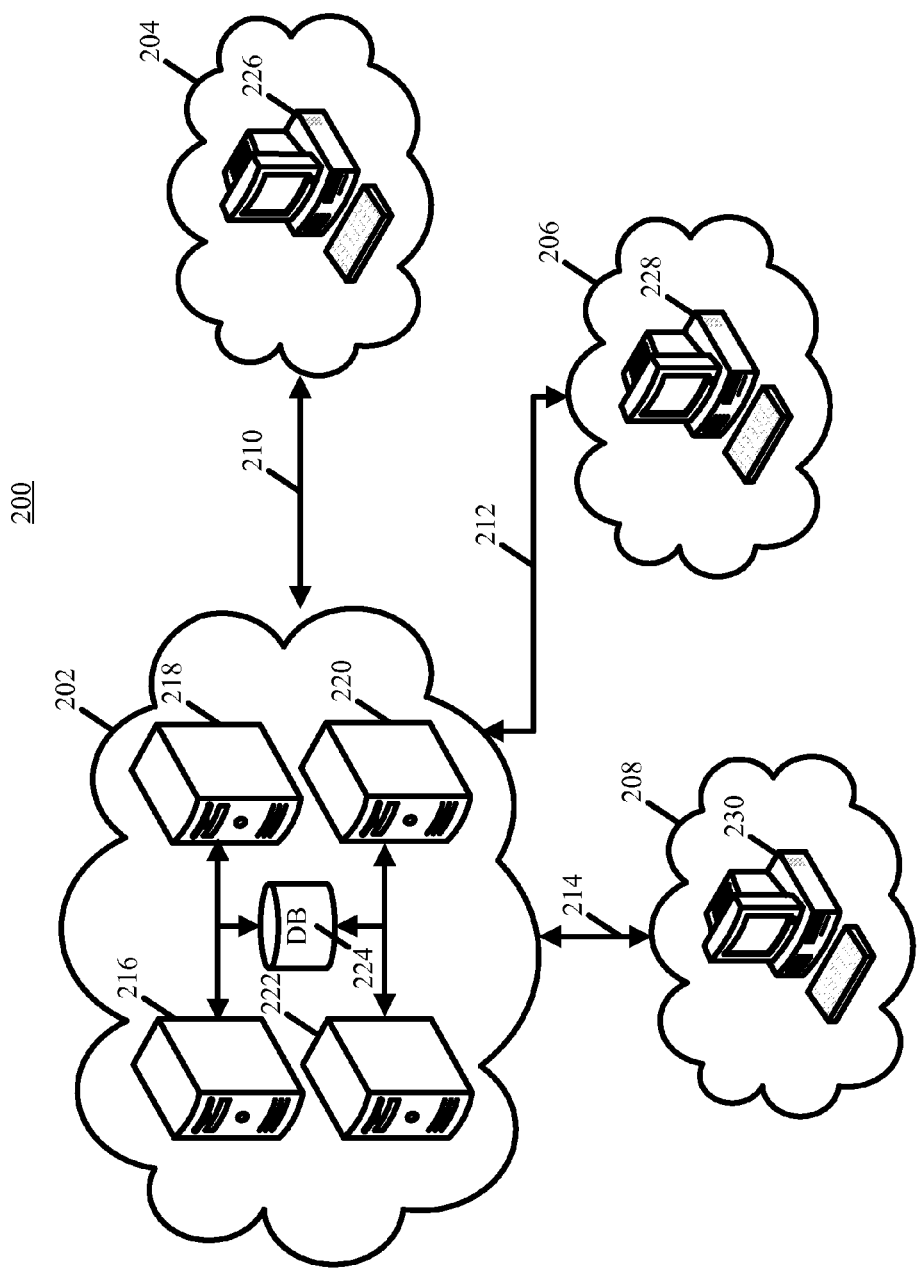
FIG. 3 is a representative block diagram of a client-server network.

FIG. 3 may depict an exemplary client-server network 200, that may be similar to or coupled to the network 10 of FIG. 1. A client-server network 200 may include individual systems 202, 204, 206, 208 coupled by networks 210, 212, 214. The networks 210, 212, 214 may be wired or wireless and may support Internet protocol version 6 (IPv6) and secured communications protocol, such as secured sockets layer (SSL). In one example, the Internet may be utilized as the networks 210, 212, 214. System 202 is a server system which may include one server or multiple servers 216, 218, 220, 222 and one or more databases 224 operatively coupled to the servers 216, 218, 220, 222. The server system 202 may be a business enterprise server system, an SQL or other database management server system, or a messaging and enterprise collaboration server system, though different server types or server utilizations may be included.

Systems 204, 206, 208 are client systems that each include a network communication device 226, 228, 230, including, but not limited to a personal computer, a telephone, a personal digital assistant, a set top box, a television, an entertainment system, and the like. In one example, the network communication devices 226, 228, 230 may be of different types that may request client sessions with one or more of the servers 216, 218, 220, 222 to execute a software routine, including, but not limited to, an operating system, an application, and the like. Although the client systems 204, 206, 208 are each shown to include one network communication device 226, 228, 230, it should be understood that different numbers of network communication devices may be utilized. Likewise, the server system 202 may include different numbers of servers. It should also be understood that multiple systems may be provided, including hundreds or thousands of client systems. Although the following disclosure generally describes the interaction between one server 216 and one client system 204, it should be understood that multiple servers 216, 218, 220, 222 may operate simultaneously, each with one or more client network communication devices 226, 228, 230 and/or with one or more client systems 204, 206, 208.

Generally, the server system 202 enables a client to request a connection and session to a server 216. A client 226 may request a session with a server 216 to utilize a server application. In one example, a server application may be a multi-threaded application capable of interacting with multiple client systems 204, 206, 208 and uses a request-response schema. Examples of multi-threaded applications include, but are not limited to, communication applications, Internet applications and graphical user interfaces. A request from a client 226 triggers the creation of a new thread in the server 216, and the server 216 is responsible for handling the request and corresponding session. Client sessions may be created when a client connects to the server 216 and establishes a session. The session may be active for as long as the client is connected to the server. Client sessions may also be created internally by the server to perform prescheduled batch jobs. The session may include the client user's context, and the server 216 uses the session to manage the request. The server 216 is operatively coupled to a memory, which is generally an internal memory, and at any given time the server may have multiple sessions stored in the memory. However, licensing requirements associated with the application may allow only a limited number of clients to use the application at any one time, or within a particular period of time.

The database 224 is a persistent database that stores session data for each persistent client session. Examples of the client session data include, but are not limited to, a session identification, a server identification, a server version, a login date and time, session status, a user identification, a security identifier, a company identification, language, session type, and a client computer identification. The database 224 may further store session data relating to persistent server sessions. Generally, server sessions relate to those servers that are active within the server system 202, and the server session data may be used to track the number of active servers as well as information about the servers. For example, the server session data may include, but is not limited to, a unique server identification for each of the servers 216, 218, 220, 222, an instance name of the server, a version of the server, a login date and time, a time of the last update on the server, and the status of the session. Although depicted as being external to each of the servers 216, 218, 220, 222, the database 224 may be provided within one of the servers 216, 218, 220, 222, or each server 216, 218, 220, 222 may include a database 224.

The client system 204 may be a single network communication device 226, a plurality of network communication devices or a system. In one example, each network communication device within a client system 204 may be considered a separate client. When a client 204 wants to use a server application, the client 204 connects to one or the servers 216, 218, 220, 222 and submits a request for a session. If accepted, the client 204 uses the server application, and the client session remains active until the client 204 disconnects, although in some cases an administrator may terminate the client session.

Using the above system 200, the server 216 may enable a client 204 to engage a server application managed by the server system 202. As mentioned above, a client 204 submits a request to a server 216 for a client session to use a server application. Provided that a client 204 is permitted to engage the server 216, the server 216 creates a client session based on the request and further based on any licensing requirements which may be associated with the server application. Data relating to the client session is stored in the database 224, which may be queried and updated by the server 216. For example, when a client submits a request to the server 216, the server may use a CreateUserSessions procedure described further below. Likewise, the server system 200 permits server sessions to be created and data relating to server sessions is stored in the database 224, which may also be queried and updated by the server 216. For example, to create a server session, a CreateServerSession procedure may be invoked, which is described further below.

Further, the server system 200 enables a server 216 to access the database 224 in order to monitor the state its client sessions, monitor the state of other servers 218, 220, 222 within the server system 200, expose session information to administrators to manage the sessions, and enforce licensing requirements. For example, a CPersistentServerSessionManager class may be used to access server session data that is stored in the database 224. A CPersistentSessionManager class is used to access the client session data stored in the database 224. Within each class, different functions may be provided to query for data, manage licenses, create and release sessions, etc.

The application program interface (API), schemas and procedures described herein enable the creation and management of persisted sessions between a client 216 and the server system 202, and further enable access to session information stored in the database 224 to enforce licensing requirements and monitor sessions. In particular, the API, schemas and procedures described herein facilitates communication between the server 216 and the database 224, creates client and server sessions, and persists the session in the database 224, regardless of the type of session or type of client. In this manner, the server system 204 may ensure scalability and increase performance, while proactively monitoring the state of client sessions and monitoring the state of other servers within the server system 204. The server system 204 may further enable management of sessions by administrators and enforce licensing rules and requirements.

Figure 4:
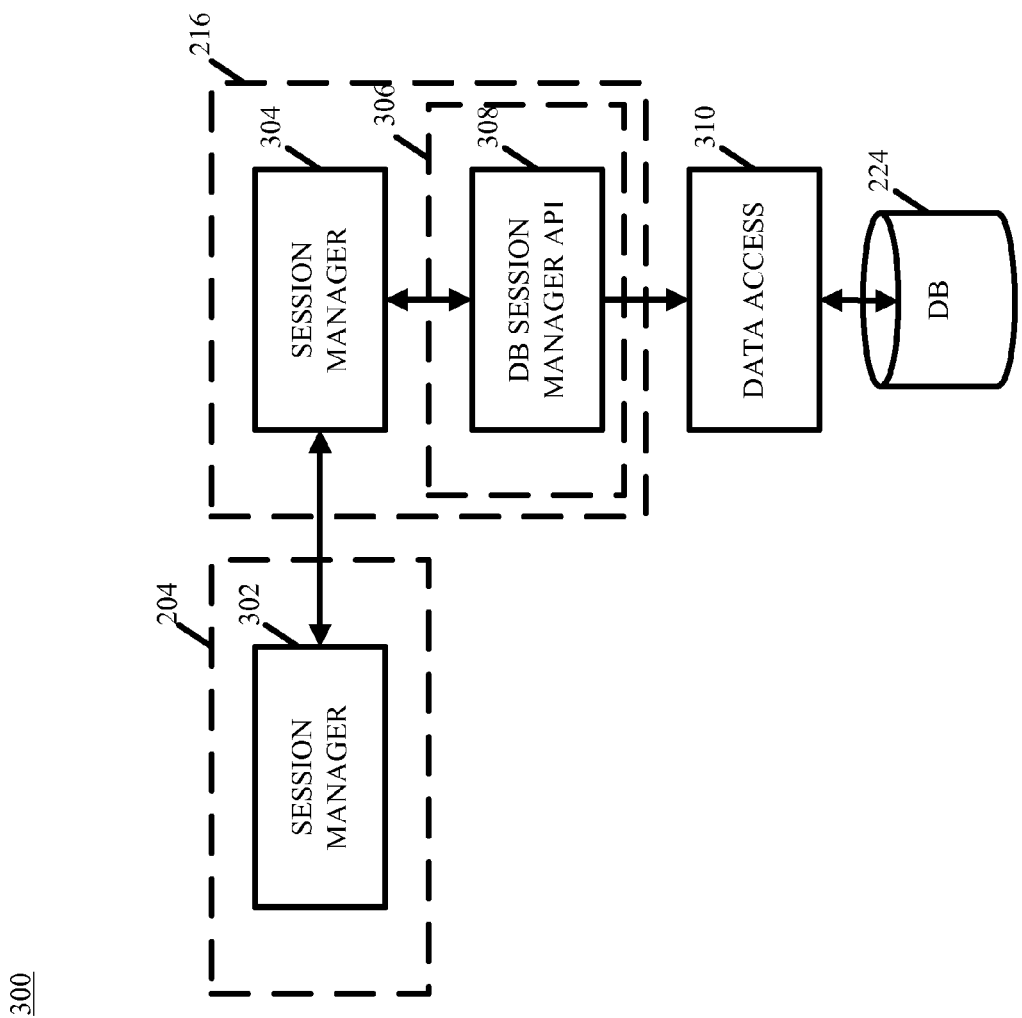
FIG. 4 is a representative block diagram of a server system and client system.

FIG. 4 represents a more detailed block diagram 300 of a server 216 and the database 224 from the server system 202, and a client 204. In particular, FIG. 4 is representative of the architecture of components that are part of the server management functionality described further herein. Referring to FIG. 4, the client 204 includes a session manager 302 to request a client session with the server 216, manage the client session from the client's end, and disconnect from the server 216. The server 216 also includes a session manager 304 and further includes a persistent session manager 306 operatively coupled to the session manager 304. Session managers, upon which the session managers 302, 304 may be based, are generally well-known.

The session manager 304 is responsible for interacting with the client 204 and for creating the session in the server memory. As will be described further below, the session manager 304 authenticates each client and then creates a session using the persistent session manager 306. The session manager 304 further tracks of all the active sessions in the server 216 within the server memory via a unique session identification that is used to uniquely distinguish each session. The session manager 304 also manages the disconnection of the session when the client 304 has finished.

The persistent session manager 306 is used to persist the sessions in the database 224 and includes a database session manager application program interface 308 for communication with the database 224. In addition, the persistent session manager 306 updates the persistent store if the user's settings change and removes the session from the database when the session is finished. In one example, the persistent session manager 306 may be used for license enforcement.

The session manager 304 uses the persistent session manager 306 to perform the operations that need access to the session information that is stored in the database 224. In particular, licenses for a server application may be purchased by one or both of the server and client. The database 224 maintains the number of active servers and the number of active clients, and the server 216 uses a count of the total number of active sessions in the database 224 to enforce the licensing requirements, such as the permitted number of concurrent users. In another example, the persistent session manager 306 may be used for session administration. In particular, the client provides a user interface that allow an administrators of the server application to monitor the sessions in the servers system 202. The user interface can be used to get information on the various sessions on the server 216, and the administrator can further use the interface to terminate any client session (e.g., for licensing violations). The database session manager application program interface 308 may be implemented in the two classes mentioned above: CPersistentServerSessionManager and CPersistentSessionManager.

The database 224 is operatively coupled to the server 216 via a data access interface 310, through which the database session manager API interacts with the database 224. The database 224 functions as a persistent session store for the persistent sessions. The session information is stored in the database 224 in two tables: SysServerSessions and SysClientSessions. The tables store the server session data and the client session data, respectively. The database 224 further handles the session creation process via two procedures stored therein: CREATESERVERSESSIONS and CREATEUSERSESSIONS. The CREATESERVERSESSIONS procedure creates a server session by using a free row or creating a new row in the SysServerSessions table. Similarly, the CREATEUSERSESSIONS procedure creates a client session by using a free row or creating a new row in the SysClientSessions table. An example of the CREATESERVERSESSIONS and CREATEUSERSESSIONS procedures is described further below.

FIGS. 5A and 5B are exemplary depictions of the SysServerSessions table 400 (FIG. 5A) and the SysClientSessions table 500 (FIG. 5B). Although the SysServerSessions table 400 and the SysClientSessions table 500 are shown to include only 4 rows each, it should be understood that the number of rows are not limited thereto, and in one example may include a number of rows equivalent to the number of server sessions or client sessions permitted under the licensing requirements.

Referring to FIG. 5A, the SysServerSessions table 400 is a kernel system table that has the server sessions data. Each active server 216, 218, 220, 222 has a row 402 in the table, such that each row corresponds to a server session. The SysServerSessions table 400 also includes columns 404, each of which relate to different types of server session data. For example, the server session data may include a unique server identification for each of the servers 216, 218, 220, 222, an instance name of the server, a version of the server, a login date and time, a time of the last update on the server, and the status of the session. In particular and as shown in FIG. 5A, the columns 404 of the SysServerSessions table 400 may include ServerId 406, AOSId 408, Instance_Name 410, Version 412, Login_date 414, Login_time 416, LastUpdateTime 418, and Status 420. The ServerId column 406 relates to an identification of the server, the datatype for which may be provided as an integer value. The AOSId column 408 is used to identify the server using the server machine name and port number. Generally, this identifier may be provided in the following format: ServerName@PortNumber, and the datatype for which may be provided as a 50 character variable character. The Instance_Name column 410 is used to identify the instance name of the server as specified in a configuration manager, the datatype for which may be provided as a 40 character variable character. The Version column 412 relates to the version of the server, the datatype for which may be provided as an integer datatype ranging from 0 through 255 with a storage size of 1 byte (e.g., Tinyint). The Login_date column 414 relates to the date when the server session was created, the datatype for which may be provided as Datetime. The Login_time column 416 relates to the time when the server session was created, the value for which may be calculated using a utility "timnow( )" function available in the kernel. The datatype for the Login_time column 416 may be provided as an integer value. The LastUpdateTime column 418 relates to the last time when server updated the table 400, and may be used to determine if the server is still alive and functioning. The datatype for the LastUpdateTime column 418 may also be provided as an integer value. The Status column relates to the status of the server (e.g., active, inactive), the datatype for which may be provided as an integer value.

Referring to FIG. 5B, the SysClientSessions table 500 is a kernel system table that has the client sessions data. Each client session has a corresponding row in the SysClientSessions table 500. The SysClientSessions table 500 also includes columns 504, each of which relate to different types of client session data. For example, the client session data may include a session identification, a server identification, a server version, a login date and time, session status, a user identification, a security identifier, a company identification, language, session type, and a client computer identification. In particular and as shown in FIG. 5B, the columns 504 of the SysClientSessions table 500 may include SessionId 506, ServerId 508, Version 510, Login_date 512, Login_time 514, Status 516, Userid 518, SID 520, Company 522, UserLanguage 524, HelpLanguage 526, SessionType 528, and ClientComputer 530. The SessionId column 506 relates to the identification for the session, and is used as the session identification by the session manager 304. The ServerId column 508 relates to a Foreign Key reference to the server identification, and is used to identify the server to which the session belongs. The datatypes for the SessionID and the ServerId may both be provided as an integer. The Version column 510 is used to match the session with the version of the server, the datatype for which may be provided as provided as an integer datatype ranging from 0 through 255 with a storage size of 1 byte (e.g., Tinyint). The Login_date column 512 relates to the date when the client session was created, the datatype for which may be provided as Datetime. The Login_time column 514 relates to the time when the client session was created, the datatype for which may be provided as an integer. The Status column 516 relates to the status of the client session (e.g., active, inactive, kill, zombie), the datatype for which may be provided as an integer datatype ranging from 0 through 255 with a storage size of 1 byte (e.g., Tinyint). The Userid column 518 relates to the login credentials for the user, the datatype for which may be provided as a 5 character value. The SID column 520 relates to the security idenfication of the user, the datatype for which may be provided as a 124 variable character value. The Company column 522 related to a company extension, the UserLanguage column 524 relates to a language extension of the client, and the HelpLanguage column 526 relates to a language extension for a help file. Each of the Company column 522, the UserLanguage column 524 and the HelpLanguage column 526 may be provided as character values of 3, 5 and 5 characters, respectively. The SessionType column 528 relates to the type of client session (communication, graphical user interface, Web), the datatype for which may be provided as an integer datatype ranging from 0 through 255 with a storage size of 1 byte (e.g., Tinyint). The ClientComputer column 530 relates to the name of the client computer or other network communication device, the datatype for which may be provided as a 40 variable character value.

Figure 6:
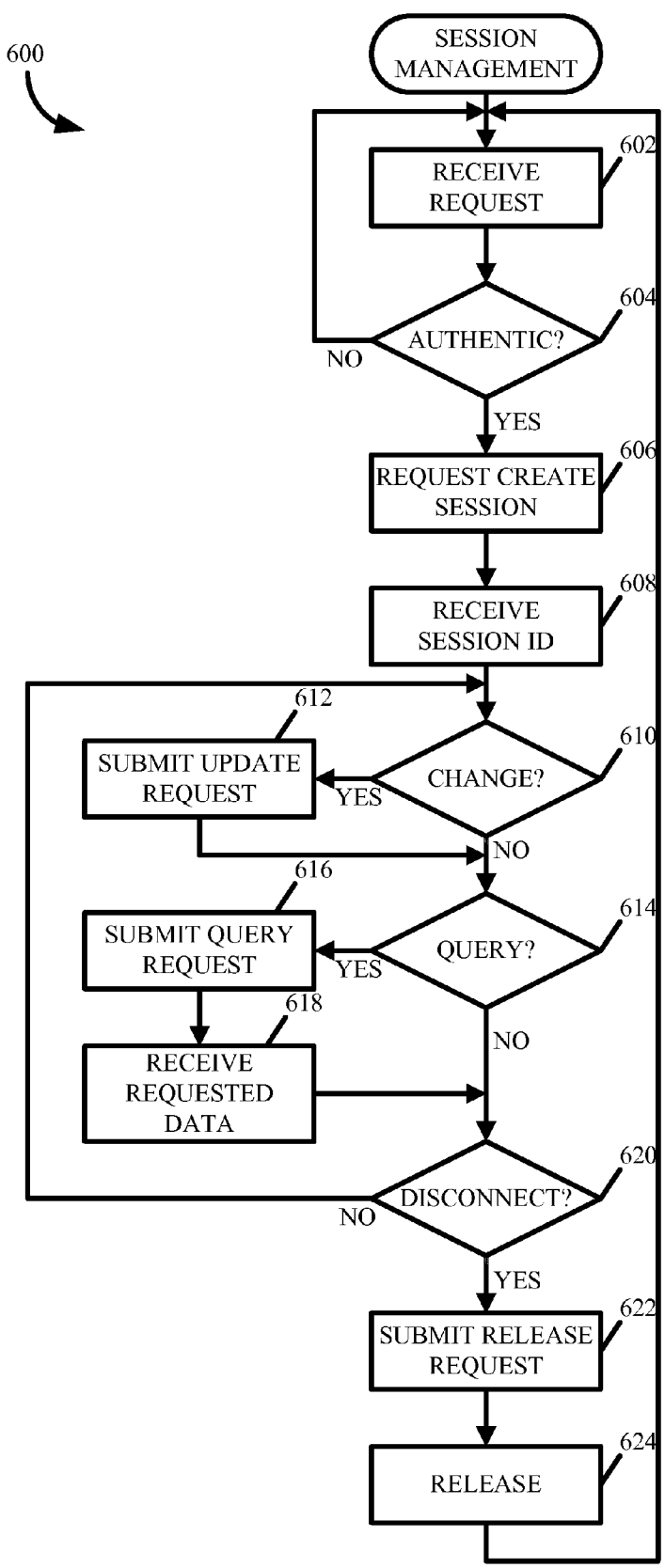
FIG. 6 is a flowchart representative of a routine for managing active sessions.

FIG. 6 is an example of a session management routine 600 that may be executed by the session manager 304 to manage client and/or server sessions. Although the following description of FIG. 6 will primarily refer to client sessions, it should be understood that the session management routine 600 is equally applicable to server sessions. Further, while the description relates to a single session, it should also be understood that the session manager 304 may simultaneously manage multiple sessions.

Beginning at block 602, the session management routine 600 may receive a session request at the server 216 from a client 204. At block 604, the session manager 304 authenticates the client 204, which may include known authentication techniques. If the client 204 is not authenticated, the routine 600 may wait for the next client request. If the client 204 is authenticated, the session manager 606 may invoke a request for the creation of a client session. The request may be sent to the database 224, which has the session creation procedures, CREATESERVERSESSIONS and CREATEUSERSESSIONS, stored therein and which may proceed to create the requested session, as described further below.

After a session has been created, a unique session identification (e.g., SessionId) is returned to the session manager 304 at block 608. The session identification uniquely identifies the newly-created session across all of the servers 216, 218, 220, 222 in the server system 202. Once a session has been created, the session manager 304 may track all of the active sessions on the server 216. For example, the session manager 304 updates the session data, queries the session data stored in the database 224, and manages the disconnection of the session when the client 204 has finished. Accordingly, at block 610 the session management routine 600 determines whether there is a change to the session, such as a client's setting change, thereby requiring an update to the session data stored in the database 224. If an update is required, the session manager 304 uses the persistent session manger 306 to update the corresponding session data at block 612.

At block 614, the session management routine 600 determines whether a query is requested. A query may be requested internally by the server 216 to monitor and enforce licensing requirements, to monitor the state of its sessions, or requested by an administrator to monitor the sessions via the user interface mentioned above. If a query is requested, as determined at block 614, the session manager 304 uses the persistent session manger 306 to submit a query request to the database 224 at block 616 requesting data on a particular session, identified by SessionId, data relating to a particular type of session data (e.g., Status), or all session data. At block 618, the session manager 304 receives the requested data via the persistent session manager 306 at block 618.

Because the session manager 304 also manages the disconnection of the session, at block 620 the session management routine 600 determines whether a disconnection was invoked. As disconnection may be invoked by a client request or inactivity of a client 204, the shutdown or inactivity of a server 218, 220, 222 being monitored or invoked by an administrator (e.g., for exceeding the number of permitted licenses). When a client session is terminated, the corresponding session is released from the database 224 via submitting a submit release request at block 622. The session manager 304 may further release any session data from its internal memory at block 624. Although the above description depicts the session manager 304 tracking the active sessions using a particular order of determinations 610, 614, 620, it should be understood that the order is not limited thereto, and may be performed simultaneously or invoked individually as desired.

As explained above, the database session manager application program interface 308 of the persistent session manager 306 may be implemented in two classes: CPersistentServerSessionManager and CPersistentSessionManager. The following provides examples of the schemas used for the database session manager interface between the session manager 304 and the database 224. Each of the classes provides a method to invoke the corresponding stored procedure to create the sessions, as described above. Once the session is created in the database 224, other functions available in these classes can be used to query the session data or to update the session data. Although C++ style notation is used to described the schemas, the schemas are not limited thereto.

CPersistentServerSessionManager—This class or method is used to access the server session data that is stored in the database 224. The functionality is implemented in the form of static functions that are used to access the server session information stored in the SysServerSessions table. The header definition for the CPersistentServerSessionManager is shown below:

```
class CPersistentServerSessionManager
{
public:
        const static TCHAR * GetServerSessionsSPSql( );
        static U_Word   GetCurrentServerId( ) { return sm_uwServerId; };
        static int          CreatePersistentServerSession(
                    const TCHAR * tszAosId,
                    const TCHAR * tszIntanceName,
                    const U_Word uwMaxNumServers);
        static CServerSession GetPersistentServerSession(const U_Word
uwserverId);
        static std::vector<CServerSession *> GetPersistentServerSessions( );
        static void         UpdateServerLastAliveTime( );
        static void         ReleaseDeadServerSessions( );
        static void         ReleaseServerSession( );
        static void         ReleaseServerSession(const U_Word uwServerId);
        static UINT         GetCountOfServerSessions( );
        static U_Word              GetServerIdForServer(const TCHAR * ptszAosId);
        static TCHAR *                 GetServerAosId( ) { return sm_tszAosId; }
        static void         SetServerAosId(TCHAR * ptszAosId);
private:
        static U_Word           sm_uwServerId;
        static TCHAR            sm_tszAosId[MAX_COMPUTERNAME_LENGTH
+ PORT_STR_LENGTH + 2];
        static void         GetServerMemberData(cqlCursor *
pcqlcsrQueryCursor, CServerSession * pServerSession);
};
```

CPersistentSessionManager—This class or method is used to access the client session data that is stored in the database 224. Static functions are used to access the client session information stored in the SysClientSessions table. An example of the header definition for the CPersistentSessionManager class is shown below:

```
class CPersistentSessionManager
{
public:
    const static TCHAR * GetUserSessionsSPSql( );
    static SESSION_ID   CreatePersistentSession(const
ClientTypeEnum eClientType,
                const TCHAR * tszSid,
                const int lClientStartId,
                const LicenseTypeEnum eLicenseType,
                XALDATE * pxdLoginDate,
                U_DWord * pudwLoginTime,
                U_Word * error);
        static bool         GetUserInfoFromPersistentSession(
                const SESSION_ID sessionid,
                usercell * rx,
                const boolean bcheckSession);
        static std::vector<SessionDatetime*> UpdateKilledSessionsToZombie( );
    static void         MarkAsKillPersistentSession(const SESSION_ID sessionid);
    static void            MarkAsZombiePersistentSession(const SESSION_ID
sessionid);
    static void             UpdateLanguagesInPersistentSession(const SESSION_ID
session,
                const TCHAR * cptszuiLang,
                const TCHAR * cptszdocLang);
        static void         ReleasePersistentSession(const SESSION_ID session);
        static void         UpdateUserInfoInPersistentSession(
```

```
                const SESSION_ID sessionid,
                const TCHAR * cptchCompany,
                const TCHAR * cptchUserId,
                const TCHAR * cptchUserLanguage,
                const TCHAR * cptchHelpLanguage,
                const TCHAR * cpclientComputerName,
                const CTINFO * cpctinfo);
    static std::vector<SessionDatetime*> GetAllKilledSessions( );
    static std::vector<SessionDatetime*>
CPersistentSessionManager::GetClientSessionsBelongingToServer(const int
clSessionStatus);
        static UINT          GetCountOfSessions(const int clSessionStatus,
                const ClientTypeEnum clientType,
                const U_Word uiServerId);
    static void          ReleaseInvalidServerAndClientSessions(const TCHAR *
ptszAosId);
        static void          ReleaseClientSessionsForServer(const U_Word
uwServerId);
        static void          DestroySessionsNotFoundPersisted(SesPblk_t * psesBlk,
void * param);
        const static TCHAR * GetSPIDKillSql(SqlConnectBase * pscbConn);
    static LicenseTypeEnum GetLicenseType(const ClientTypeEnum
eClientType, const WorkerSessionType eWorkerType);
private:
        static void          GetPersistentSessionInfo(
                const SESSION_ID sessionid,
                usercell * pUserCell);
        static void          UpdateSessionColumn(const SESSION_ID sessionid,
                const DBFHDL_EXT column,
                const int clValue);
        static UINT          GetMaxLicenseCount(const ClientTypeEnum clientType);
        static void          UpdateColumnsAtRelease(SqlTable * pTable, cqlCursor
*pcqlcsrUpdateCursor, xList<assignmentNode *> * pasgnndList);
};
```

Figure 7:
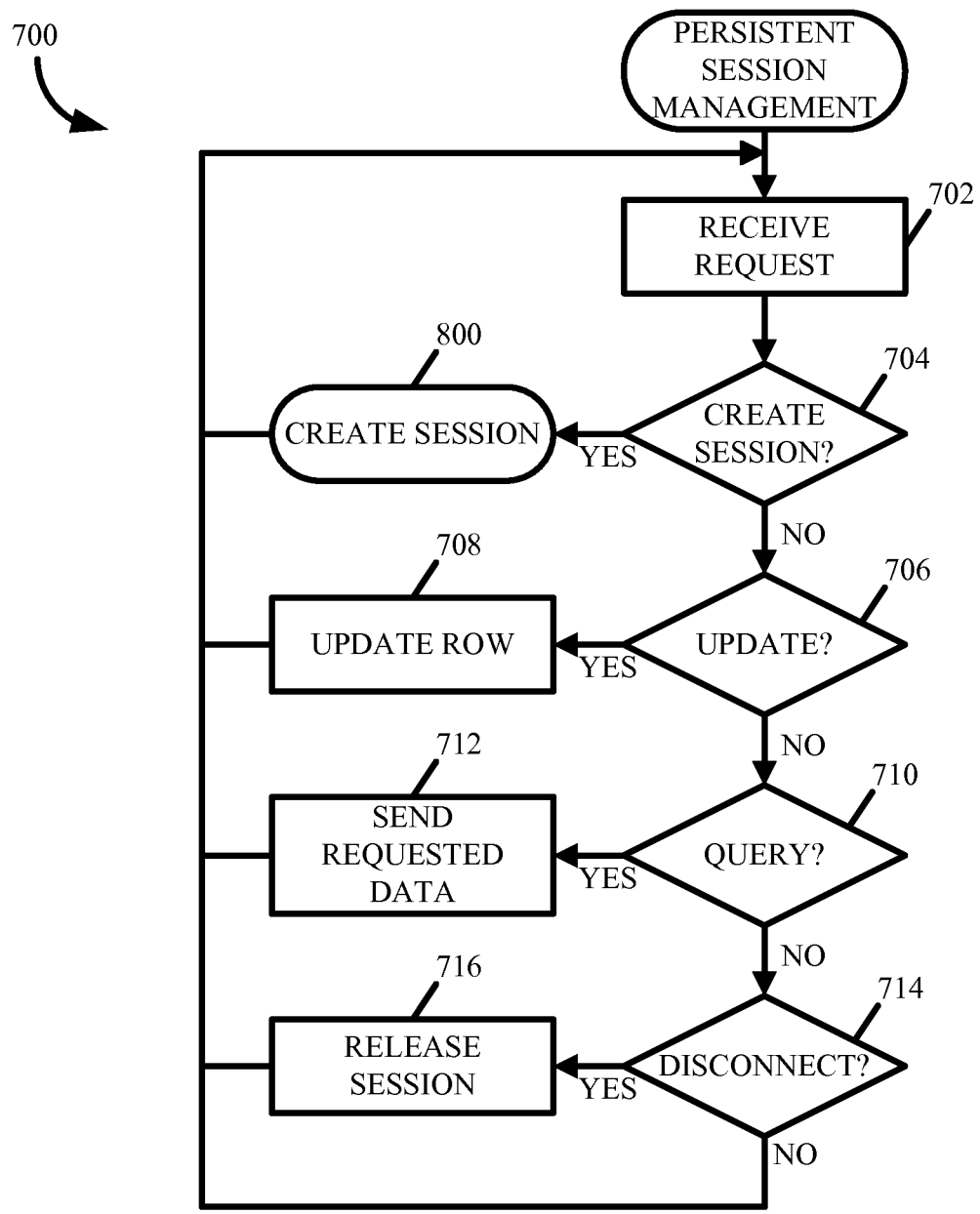
FIG. 7 is a flowchart representative of a routine for receiving and handling server requests for persisted session data.

FIG. 7 is an example of a persistent session management routine 700 that may be executed by the database 224 to manage persistent client and/or server sessions. Although the following description of FIG. 7 will primarily refer to client sessions, it should be understood that the persistent session management routine 700 is equally applicable to server sessions. Further, while the description relates to a single session, it should also be understood that the database 224 may simultaneously manage multiple sessions.

Beginning at block 702, the persistent session management routine 700 may wait for and receive a request. The request may relate to any one of the requests from a server 216, 218, 220, 222 at blocks 602, 612, 616, or 622 of the session management routine 600, a request from an administrator, etc. In particular, the persistent session management routine 700 may receive a request as provided in one of the above classes, CPersistentServerSessionManager or CPersistentSessionManager. For example, if the request relates to a request create a new session, as determined at block 704, the database 224 may invoke the session creation routine 800, described further below. If the request relates to a request to update session data for a session, which may be identified by the corresponding SessionId, the database 224 updates the corresponding row in the SysServerSessions table 400 or SysClientSessions table 500 at block 708. If the request relates to a query for session data, as determined at block 710, the database 224 may retrieve the requested session data from the SysServerSessions table 400 or SysClientSessions table 500, and provide the session data at block 712.

If the request relates to a release session request as determined at block 714, the database 224 releases the session at block 716. For example, client sessions are released by putting NULL values for all the columns in the SysClientSessions table 500 except the session identification, thereby allowing the session identification to be reused for another client session, as described further below. A similar operation is performed for the SysServerSessions table 400 when a server session is terminated. As described further below, all client sessions belonging to the server whose session was terminated are also released from the SysClientSessions table 500, in addition to the server session being released from the SysServerSessions table 400. Although the above description depicts the session manager 304 tracking the active sessions using a particular order of determinations 610, 614, 620, it should be understood that the order is not limited thereto, and may be performed simultaneously or invoked individually as desired.

Figure 8:
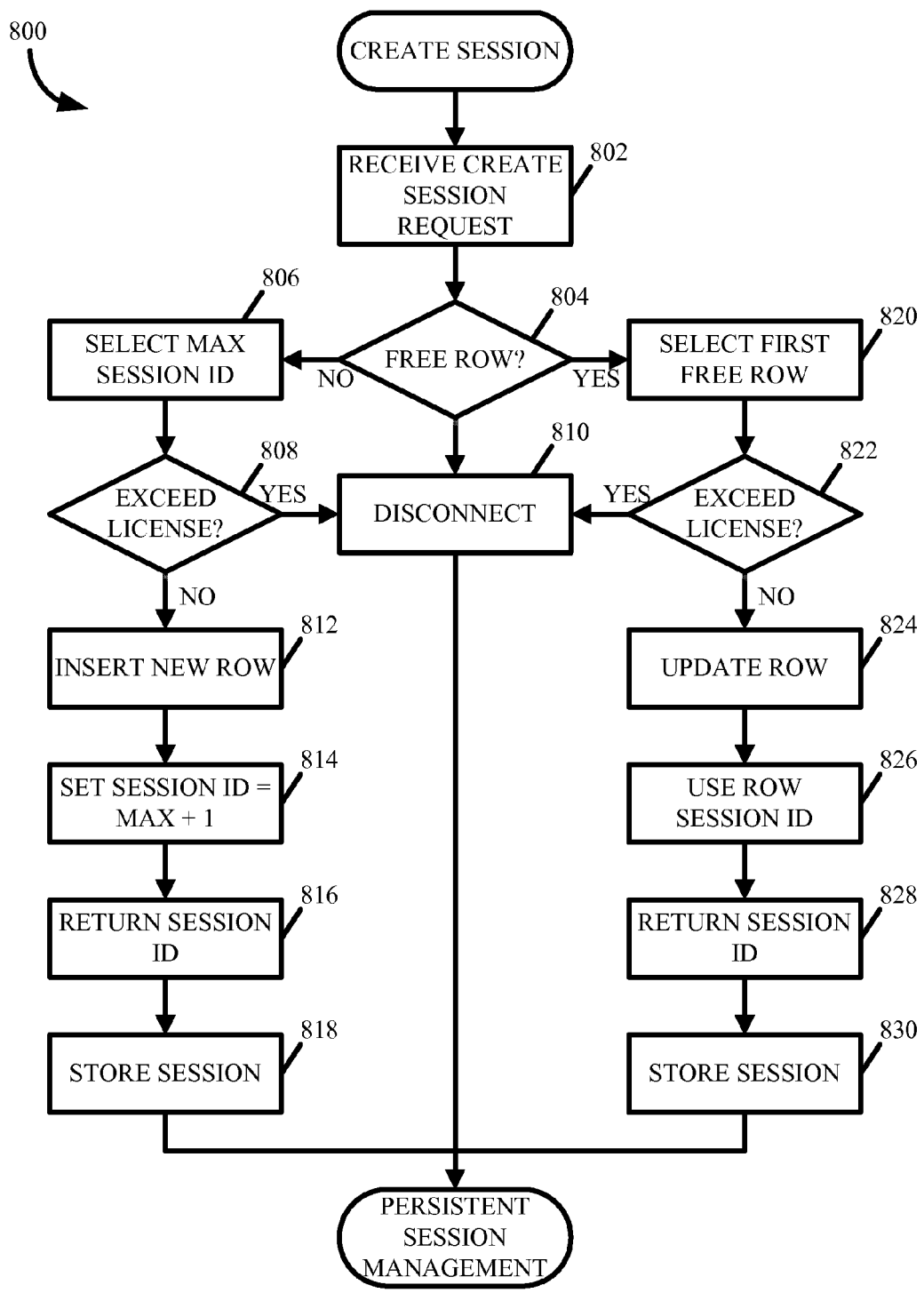
FIG. 8 is a flowchart representative of a routine for creating new sessions.

FIG. 8 is an example of a session creation routine 800 that may be executed by the database 224 to create client and/or server sessions. However, the database 224 may handle the creation of client sessions and server session separately using two procedures stored therein: CREATESERVERSESSIONS and CREATEUSERSESSIONS. The CREATESERVERSESSIONS creates a server session by using a free row or creating a row in the SysServerSessions table 400. The CREATEUSERSESSIONS creates a client session by using a free row or creating a row in the SysClientSessions table 500. The use of a common stored procedure to create a client session, and thus generate a client session identification, ensures that the session identifications are unique across the different servers. Similarly, a common stored procedure to create server sessions also ensures a unique session identification within the server system 202. Although separate procedures may be used, both the stored procedures use a similar logic to create sessions in the database. A sample pseudo-computer code implementation for creating a session may be as follows:

```
begin
    select first free row (UPDLOCK, READPAST)
    if free row is available
    begin
        update row with new session information and check that new row will not
exceed the licenses.
        return the session-id of the above updated row.
    end
    else
    begin
        select maximum value of the existing session-id from the current rows in
the table (UPDLOCK) and check that inserting new row will not exceed the
licenses.
        insert new row and set session-id to the above maximum value + 1.
            Return the session-id of the newly inserted row.
    end
end
```

An explanation applicable to the above procedures will now be described with reference to FIG. 8. While the following description will primarily refer to client sessions, it should be understood that the session creation routine 800 is equally applicable to server sessions. Further, while the description relates to a single session, it should also be understood that the database 224 may simultaneously create multiple sessions.

Beginning at block 802, the routine 800 is invoked at block 802 by receiving a create session request from a server 216, as described with reference to FIG. 7. Upon receiving such a request, the session creation routine 800 determines whether a row is available in the session table 400, 500. As mentioned above, released sessions result in NULL values for all entries in the session row, with the exception of the SessionId. As such, rows that already have a unique SessionId may be freed and reused.

If such a row is not available, the database 224 may proceed to insert a new row into the session table 400, 500 for a new session. In particular, the database 224 selects the maximum session identification from among the session identifications within the table 400, 500 at block 806. In order to ensure that licensing requirements are not violated, the session creation routine 800 verifies at block 808 that the inclusion of a new session will not exceed the number of sessions allowed by the corresponding license, such as a license associated with a server application for which the session is requested. If the number of allowances would be exceeded, the client may be disconnected at block 810 by returning a rejection to the session manager 304.

If the license requirements are met, the routine 800 inserts a new row into the session table 400, 500 at block 812 and assigns a new unique session identification at block 814. The new session identification may be based on the maximum session identification determined from block 806 with the maximum session identification incremented by an integer or character corresponding to the SessionId datatype to create the new session identification.

Because the database 224 can handle multiple session creation requests simultaneously, the session creation routine 800 may invoke a locking process to reserve a session identification for a particular request while the session is being created. Accordingly, beginning at block 806 through block 816, the session creation routine 800 may use an efficient locking mechanism to ensure that the routine 800 operates correctly in the presence of many concurrent requests and also to ensure that the database 224 does not become a bottleneck under heavy load. For example, in handling concurrent requests to create sessions, the new session identification based on maximum value of existing row uses an UPDLOCK to ensure that multiple requests do not return the newly-created session identification.

The newly-created session identification is returned to the session manager 304 at block 816 to uniquely identify the session within the server system 202, and the session data is stored in the corresponding row at block 818.

Referring back to block 804, if a free row is available the session creation routine 800 selects the first free row it finds at block 820. Again, because the database 224 may concurrently create multiple sessions, the routine 800 may utilize an efficient locking mechanism along with an option to read past any previously locked session identifications. For example, at block 804 the routine 800 may invoke a READPAST option to read past any locked rows and beginning at block 820 invoke the UPDLOCK mentioned above to lock the first free row the routine finds.

In order to ensure that licensing requirements are not violated, the session creation routine 800 verifies at block 822 that the new session will not exceed the number of sessions allowed by the corresponding license. If the number of allowances would be exceeded, the client may be disconnected at block 810 by returning a rejection to the session manager 304. If the license requirements are met, the routine 800 updates the existing row at block 824 and uses the existing session identification associated with the row at block 826. The session identification is returned to the session manager 304 at block 828 to uniquely identify the session within the server system 202, and the session data is stored in the corresponding row at block 830.

Figure 9:
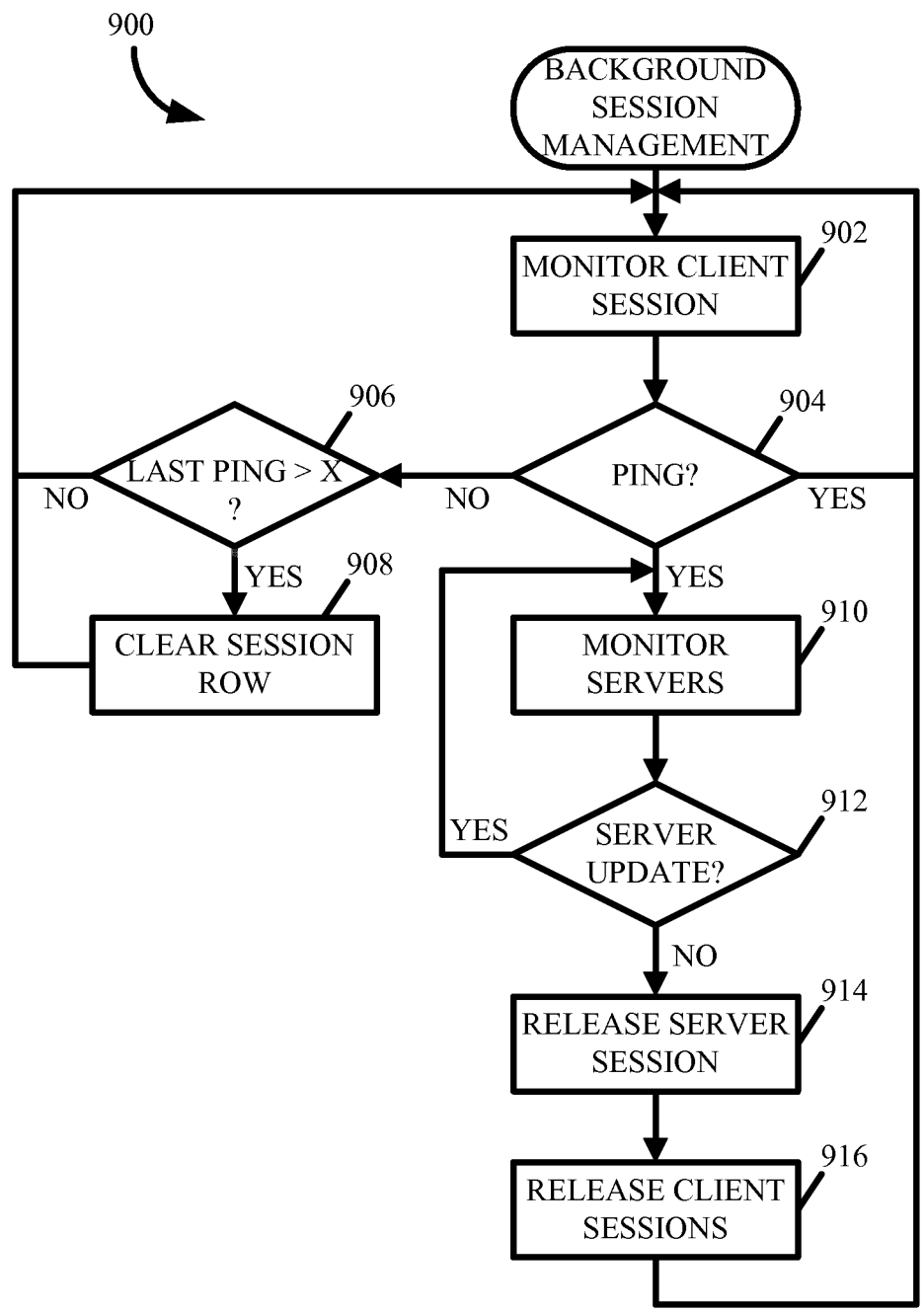
FIG. 9 is a flowchart representative of a routine for monitoring the state of client sessions and server sessions.

FIG. 9 is an example of a background session management routine 900 that may be executed by the session manager 304 to monitor client sessions and server sessions. In particular, each server 216, 218, 220, 222 has a background thread that monitors the state of its own sessions and also monitors the state of other servers in the servers system 202. If the session manger 304 determines that a client or server is no longer alive, the corresponding sessions are released in order to free up the session identifications and the corresponding rows for new session.

Beginning at block 902, the session manager 304 monitors the state of the client sessions associated with the corresponding server 216. In particular, a client 204 engaged in a client session sends a ping, or other indication of its alive status, to the server 216. The session manger 304 periodically or continually monitors the occurrence of the ping at block 904. If the server 216 does not receive a ping within a predetermined period of time since the client's last ping as determined at block 906, the session manager 304 destroys and releases the client session, and submits a release request to the database 224 to clear the corresponding row in the SysClientSessions table 500. As mentioned above, client sessions are released by putting NULL values for all the columns in the SysClientSessions table 500 except the session identification, thereby allowing the session identification to be reused.

At block 910, the background session management routine 900 monitors the state of the server sessions associated with the other servers 218, 220, 222 within the server system 202. In particular, each server 216, 218, 220, 222 updates the database 224 periodically indicating its alive status. The session manager 304 may periodically request an update of this information from the database 224, by submitting a query request for the LastUpdateTime for a particular server identified by the server identification or session identification or for all servers within the servers system 202. If a server has not provided at update, or if the time since the last update as kept in the LastUpdateTime exceeds a predetermined period of time, as determined at block 912, the session manager 304 may request a release of the server session at block 914. As with client session, the server sessions may be released by putting NULL values for all the columns in the SysServerSessions table 400 except the session identification, thereby allowing the session identification to be reused for other server sessions. In addition, the background session management routine 900 requests a release of all client session associated with the released server at block 916 in order to release the licenses if a server dies and stops updating the database 224.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A method, comprising:
receiving a request to create a new session of a server application from a server in a server system comprising a plurality of servers, each server comprising a session manager and a persistent session manager operatively coupled to the session manager, wherein the session manager creates a session within the server using the persistent session manager;
verifying that creating the new session will not violate a license associated with the server application, based on a total number of active sessions of the server application on all of the plurality of servers and a number of active sessions permitted by the license;
creating the new session, and a new unique session identification associated with the new session, based on the request and the verification that creating the new session will not violate the license, the new unique session identification unique among a plurality of sessions across the plurality of servers;
persisting the new session in response to receiving a request from the persistent session manager of the server corresponding to the new session, the new session persisted with a plurality of persisted sessions among the plurality of servers; and
asynchronously managing at least one of the plurality of persisted sessions within any one or more of the plurality of servers according to the unique session identification, wherein each session manager in each of the plurality of servers is capable of independently managing the at least one of the plurality of persisted sessions persisted within the database via the persistent session manager.

2. The method of claim 1, the total number of active sessions comprising a number of active server sessions and a number of active client sessions.

3. The method of claim 1, the server system comprising a client session table and a server session table.

4. The method of claim 3, a number of rows of the client session table corresponding to a number of active client sessions permitted by the license.

5. The method of claim 3, the request comprising a request to create a new server session of the server application, creating the new server session comprising assigning a new unique client session identification to a row in the server session table.

6. The method of claim 5, the request to create the new server session received from a server among the plurality of servers.

7. An article of manufacture comprising a computer-readable storage medium, the medium not including a signal, containing computer-executable instructions stored on the computer-readable storage medium that when executed cause one or more processors within a server system comprising a plurality of servers to:
receive a request to create a new session of a server application from a server in the server system, each server comprising a session manager and a persistent session manager operatively coupled to the session manager, wherein the session manager creates a session within the server using the persistent session manager;
verify that creating the new session will not violate a license associated with the server application, based on a total number of active sessions of the server application on all of the plurality of servers and a number of active sessions permitted by the license;
create the new session, and a new unique session identification associated with the new session, based on the request and the verification that creating the new session will not violate the license, the new unique session identification unique among a plurality of sessions across the plurality of servers;
persist the new session in the server system in response to receiving a request from the persistent session manager of the server corresponding to the new session, the new session persisted with a plurality of persisted sessions among the plurality of servers; and
asynchronously manage at least one of the plurality of persisted sessions within any one or more of the plurality of servers according to the unique session identification, wherein each session manager in each of the plurality of servers is capable of independently managing the at least one of the plurality of persisted sessions persisted within the database via the persistent session manager.

8. The article of manufacture of claim 7, the total number of active sessions comprising a number of active server sessions and a number of active client sessions.

9. The article of manufacture medium of claim 7, the server system comprising a client session table and a server session table.

10. The article of manufacture of claim 9, a number of rows of the client session table corresponding to a number of active client sessions permitted by the license.

11. The article of manufacture of claim 9, the request comprising a request to create a new server session of the server application, creating the new server session comprising assigning a new unique client session identification to a row in the server session table.

12. The article of manufacture of claim 11, the request to create the new server session received from a server among the plurality of servers.

13. The article of manufacture of claim 12, comprising persisting each of the active sessions of the server application among the plurality of servers in response to receiving a request from a persistent session manager of the server, wherein the persistent session manager of the server persists the active sessions of the server.

14. An apparatus, comprising:
a memory storing machine-readable instructions; and
a processor for executing the machine-readable instructions to perform a method comprising:
receiving a request to create a new session of a server application from a server in a server system comprising a plurality of servers, each server comprising a session manager and a persistent session manager operatively coupled to the session manager, wherein the session manager creates a session within the server using the persistent session manager;
verifying that creating the new session will not violate a license associated with the server application, based on a total number of active sessions of the server application on all of the plurality of servers and a number of active sessions permitted by the license;
creating the new session, and a new unique session identification associated with the new session, based on the request and the verification that creating the new session will not violate the license, the new unique session identification unique among a plurality of client sessions across the plurality of servers;
persisting the new session in the server system in response to receiving a request from the persistent session manager of the server corresponding to the new session, the new session persisted with a plurality of persisted sessions among the plurality of servers; and
asynchronously managing at least one of the plurality of persisted sessions within any one or more of the plurality of servers according to the unique session identification, wherein each session manager in each of the plurality of servers is capable of independently managing the at least one of the plurality of persisted sessions persisted within the database via the persistent session manager.

15. The apparatus of claim 14, the total number of active sessions comprising a number of active server sessions and a number of active client sessions.

16. The apparatus of claim 14, the server system comprising a client session table and a server session table.

17. The apparatus of claim 16, a number of rows of the client session table corresponding to a number of active client sessions permitted by the license.

18. The apparatus of claim 16, the request comprising a request to create a new server session of the server application, creating the new server session comprising assigning a new unique client session identification to a row in the server session table.

19. The apparatus of claim 18, the request to create the new server session received from a server among the plurality of servers, the method comprising persisting each of the active sessions of the server application among the plurality of servers in response to receiving a request from a persistent session manager of the server, wherein the persistent session manager of the server persists the active sessions of the server.

* * * * *